US009837757B2

United States Patent
Yoshikawa et al.

(10) Patent No.: US 9,837,757 B2
(45) Date of Patent: Dec. 5, 2017

(54) LEAD-FREE SOLDER ALLOY AND IN-VEHICLE ELECTRONIC CIRCUIT

(71) Applicant: SENJU METAL INDUSTRY CO., LTD., Tokyo (JP)

(72) Inventors: Shunsaku Yoshikawa, Tokyo (JP); Naoko Hirai, Tokyo (JP); Ken Tachibana, Tokyo (JP); Yoshie Tachibana, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/782,142

(22) PCT Filed: Apr. 3, 2014

(86) PCT No.: PCT/JP2014/059902
§ 371 (c)(1),
(2) Date: Oct. 2, 2015

(87) PCT Pub. No.: WO2014/163167
PCT Pub. Date: Oct. 9, 2014

(65) Prior Publication Data
US 2016/0056570 A1 Feb. 25, 2016

(30) Foreign Application Priority Data

Apr. 2, 2013 (JP) ................................. 2013-077289

(51) Int. Cl.
*H01R 13/58* (2006.01)
*B23K 35/26* (2006.01)
(Continued)

(52) U.S. Cl.
CPC ......... *H01R 13/58* (2013.01); *B23K 35/0222* (2013.01); *B23K 35/26* (2013.01);
(Continued)

(58) Field of Classification Search
CPC .......... H01R 4/02; H01R 12/71; H01R 13/58; B23K 35/0222; B23K 35/26;
(Continued)

(56) References Cited

U.S. PATENT DOCUMENTS 8,845,826 B2 9/2014 Kawamata et al.
8,847,390 B2 9/2014 Hashino et al.
(Continued)

FOREIGN PATENT DOCUMENTS

EP 0629466 A1 * 12/1994 .......... B23K 35/262
EP 2875898 5/2015
(Continued)

OTHER PUBLICATIONS

Atsushi et al., English machine translation of JP5722302 B2, May 2015, p. 1-13.*
(Continued)

*Primary Examiner* — Jie Yang
(74) *Attorney, Agent, or Firm* — Young & Thompson

(57) ABSTRACT

With the increasing density of in-vehicle electronic circuits, not only conventional cracks at bonding interfaces such as between the substrate and the solder attachment site or a component and the solder attachment site but also novel cracking problems of cracks occurring in the Sn matrix in the interior of the bonded solder have appeared. To solve the above problem, a lead-free solder alloy with 1-4 mass % Ag, 0.6-0.8 mass % Cu, 1-5 mass % Sb, 0.01-0.2 mass % Ni and the remainder being Sn is used. A solder alloy, which not only can withstand harsh temperature cycling characteristics from low temperatures of −40° C. to high temperatures of 125° C. but can also withstand external forces that occur when riding up on a curb or colliding with a vehicle in front for long periods, and an in-vehicle electronic circuit device using the solder alloy can thereby be obtained.

19 Claims, 4 Drawing Sheets

(51) Int. Cl.
| | |
|---|---|
| *C22C 13/00* | (2006.01) |
| *C22C 13/02* | (2006.01) |
| *B23K 35/02* | (2006.01) |
| *H01R 4/02* | (2006.01) |
| *H01R 12/71* | (2011.01) |
| *B23K 101/36* | (2006.01) |
| *B23K 101/42* | (2006.01) |

(52) U.S. Cl.
CPC ............ *B23K 35/262* (2013.01); *C22C 13/00* (2013.01); *C22C 13/02* (2013.01); *H01R 4/02* (2013.01); *H01R 12/71* (2013.01); *B23K 2201/36* (2013.01); *B23K 2201/42* (2013.01)

(58) Field of Classification Search
CPC .............. B23K 35/262; B23K 2201/36; B23K 2201/42; C22C 13/00; C22C 13/02
See application file for complete search history.

(56) References Cited

U.S. PATENT DOCUMENTS

| | | |
|---|---|---|
| 2007/0036671 A1 | 2/2007 | Albrecht et al. |
| 2013/0098506 A1 | 4/2013 | Toyoda et al. |
| 2015/0136461 A1 | 5/2015 | Imamura et al. |
| 2015/0221606 A1 | 8/2015 | Yamanaka et al. |
| 2015/0305167 A1* | 10/2015 | Nakanishi ............. B23K 35/26 174/257 |

FOREIGN PATENT DOCUMENTS

| | | | |
|---|---|---|---|
| JP | 2004-122223 | 4/2004 | |
| JP | 2005-340275 | 12/2005 | |
| JP | 2006-524572 | 11/2006 | |
| JP | 2007-237252 | 9/2007 | |
| JP | 5349703 | 11/2013 | |
| JP | 2014-027122 | 2/2014 | |
| JP | 2014-028391 | 2/2014 | |
| JP | 5722302 B2 * | 5/2015 | ........... B23K 35/025 |
| WO | 2009011341 | 1/2009 | |
| WO | 2011102034 | 8/2011 | |
| WO | 2011151894 | 12/2011 | |
| WO | 2014002283 | 1/2014 | |
| WO | 2014013847 | 1/2014 | |

OTHER PUBLICATIONS

International Search Report PCT/JP2014/059902 dated Jun. 17, 2014.
Third Party Observations PCT/IB/345 dated Mar. 24, 2015.
JP Office Action dated Apr. 21, 2015, with partial English Translation; Application No. 2015-510145.
Chinese Official Action—201480020217.7—dated Jun. 13, 2016.

* cited by examiner

LEAD-FREE SOLDER ALLOY AND IN-VEHICLE ELECTRONIC CIRCUIT

TECHNICAL FIELD

The present invention relates to a lead-free solder alloy which has excellent temperature cycle characteristics and is resistant to impact of a collision or the like, and an in-vehicle electronic circuit unit.

BACKGROUND ART

Electronic circuits (hereinafter referred to as "in-vehicle electronic circuits") obtained by soldering electronic parts such as semiconductor and chip resistor parts to printed circuit boards (hereinafter referred to as "printed boards") are mounted on a vehicle. Such an in-vehicle electronic circuit is used in a unit for electrically controlling components such as engine, power steering and brake, and such a unit is a safety part which is very important for the vehicle travel. In particular, an in-vehicle electronic circuit unit called ECU (Engine Control Unit) which is provided with an electronic circuit allowing a computer to control the vehicle travel and particularly the engine operation in order to improve fuel efficiency must be operable in a stable state without any failure over a prolonged period of time. In general, the ECU is often disposed in the vicinity of the engine and is in a rather severe operating environment. In this specification, the in-vehicle electronic circuit unit is also referred to simply as "ECU" or "ECU electronic circuit unit."

When the engine is rotated, the vicinity of the engine where such an in-vehicle electronic circuit is disposed has a very high temperature of 125° C. or more. On the other hand, when the engine rotation is stopped, the outside air temperature in the winter season lowers to −40° C. or less in cold regions such as North America and Siberia. Therefore, the in-vehicle electronic circuit is exposed to heat cycles in a range from −40° C. or less to +125° C. or more by repeatedly operating and stopping the engine.

When the in-vehicle electronic circuit is disposed for a long period of time in an environment in which the temperature thus varies considerably, electronic parts and a printed board cause thermal expansion and contraction. However, since there is a large difference between the coefficient of linear expansion of the electronic parts mainly made of ceramics and that of the printed board made of a glass epoxy substrate, a certain degree of thermal displacement occurs at each of portions where the electronic parts are joined to the printed board by soldering (hereinafter referred to as "solder joint portions") during the use in the foregoing environment and the solder joint portions are repeatedly stressed by such temperature variations. Then, such stresses eventually cause breakage of the solder joint portions at their joint interfaces. In the electronic circuit, when a solder joint portion is not completely broken but is cracked even at a crack ratio of up to 99%, the circuit resistance value may increase to cause malfunction even in an electric conduction state. The situation that a crack occurs in the solder joint portion to cause malfunction of the in-vehicle electronic circuit unit and in particular the ECU must be avoided. As described above, the temperature cycle characteristics are particularly important for the in-vehicle electronic circuit unit and in particular the ECU, and the solder joint portion, that is, the solder alloy for use therein is also required to be usable even under the severest possible temperature conditions.

A lead-free solder for vehicles (WO 2009/011341A, Patent Literature 1) comprising: 2.8 to 4 wt % of Ag; 1.5 to 6 wt % of Bi; 0.8 to 1.2 wt % of Cu; at least one selected from the group consisting of Ni, Fe and Co in a total amount of 0.005 to 0.05 wt %; and a balance of Sn is disclosed as a solder for use in an in-vehicle electronic circuit unit and in particular an ECU which is under severe conditions of use.

There is also disclosed a soldering material (JP 2006-524572 A, Patent Literature 2) comprising an alloy that comprises, as the simple solder alloy composition, 10 wt % or less of Ag (silver), 10 wt % or less of Bi (bismuth), 10 wt % or less of Sb (antimony) and 3 wt % or less of Cu (copper) in addition to Sn (tin) as the major constituent, wherein the alloy further comprises 1.0 wt % or less of Ni (nickel).

CITATION LIST

Patent Literature

Patent Literature 1: WO 2009/011341
Patent Literature 2: JP 2006-524572 A

SUMMARY OF INVENTION

Technical Problems

As is seen in the popularization of hybrid vehicles and electric vehicles, shifting from mechanical parts to electronic parts in vehicles is going on and automobile electronic circuits which had dimensional room are also correspondingly required to be downsized. Therefore, as a matter of course, the in-vehicle electronic circuit which was conventionally soldered by flow soldering following reflow soldering is soldered in recent years by two-sided reflow soldering according to which both sides are subjected to surface mounting with solder paste. This increased the density of the in-vehicle electronic circuit, thus causing crack mode defects that had not theretofore been seen.

By the way, the invention in Patent Literature 1 discloses a solder alloy having a long service life in a severe environment. However, a vehicle is used as a transportation means and is therefore less likely to be allowed to stand in one place and more likely to be used on a road or the like. When the vehicle is thus used on a road, a rough road causes vibrations to be applied to the in-vehicle electronic circuit unit at all times and the vehicle may drive over a curb or collide with a vehicle driving ahead. In this way, external forces are often applied to the in-vehicle electronic circuit unit. In the case of a big accident caused by vehicle collision, the whole of the in-vehicle electronic circuit unit is often replaced but in a simple accidental contact, the vehicle often receives only exterior replacement. The in-vehicle electronic circuit unit must withstand not only severe environments but also forces applied from the outside.

In particular, recent vehicles are getting computerized along with the popularization of electric vehicles and hybrid vehicles and in-vehicle electronic circuit units are also made smaller in size and higher in density. Therefore, the solder content in a solder joint portion of an in-vehicle electronic circuit is also reduced. For example, the solder content in a solder joint portion of a 3216 size chip part is in general 1.32 mg on one side, whereas the solder content for use in an in-vehicle electronic circuit is as small as less than 0.28 mg on one side. Therefore, in a conventional electronic circuit, a solder fillet portion protrudes on the lateral side of a chip part as in FIG. 1 but in a solder joint portion of an in-vehicle electronic circuit, a solder fillet is hardly formed on the lateral side of a chip part as in FIG. 2. Accordingly, a new crack mode in which a crack propagates in a substantially straight line as in FIG. 2 occurs in the solder joint portion of the in-vehicle electronic circuit and may cause a problem of malfunction.

The present invention aims at developing a solder alloy which is capable of withstanding for a long period of time not only severe temperature cycle characteristics including a low temperature of −40° C. and a high temperature of 125° C. but also an external force caused by driving over a curb or colliding with a vehicle driving ahead as well as an in-vehicle electronic circuit unit using the solder alloy.

Solution to Problems

The inventors of the invention have found that it is effective to form a solid solution strengthened alloy by adding an element which may enter into solid solution in an Sn phase in order to withstand an external force after a prolonged temperature cycling, Sb is an optimal element to form the solid solution and precipitation strengthened alloy, and addition of Sb to an Sn matrix forms a fine SnSb intermetallic compound and also has the effect of precipitation and dispersion strengthening. The present invention has been thus completed.

The present invention provides a lead-free solder alloy including: 1 to 4 wt % of Ag; 0.6 to 0.8 wt % of Cu; 1 to 5 wt % of Sb; 0.01 to 0.2 wt % of Ni; and a balance of Sn. Bi may be further added in an amount of 1.5 to 5.5 wt %. At least one element selected from Co and Fe may be further added in a total amount of 0.001 to 0.1 wt %.

The alloy according to the invention has the following metallurgical structure characteristics: The solder alloy is composed of a structure in which Sb enters into solid solution in an Sn matrix; the structure is in a state in which the Sb enters into solid solution in a stable manner at a high temperature of, for example, 125° C. but the Sb gradually enters into solid solution in the Sn matrix in a supersaturated state as the temperature decreases and the Sb precipitates in the form of an SnSb intermetallic compound at a low temperature of, for example, −40° C.

The present invention further provides an in-vehicle electronic circuit obtained by soldering using the foregoing solder alloy and an in-vehicle electronic circuit unit provided with the electronic circuit.

The term "in-vehicle" or "for vehicles" as used herein means that an electronic circuit or electronic circuit unit is mounted on a vehicle and more specifically ensures predetermined characteristics and is mountable on a vehicle even when used as it is repeatedly exposed to a severe usage environment, that is, a temperature environment ranging from −40° C. to 125° C. To be more specific, the electronic circuit or electronic circuit unit may withstand a heat cycle test carried out for 3,000 cycles even under such a temperature environment and has resistance to a shear test for evaluating external forces even under the condition.

The solder alloy of the invention forms fine Sb precipitates even after being exposed to a temperature cycle and does not cause structure deterioration including coarsening of a compound because of the following reasons:

The solder alloy for vehicles to be joined by reflow soldering is subjected to a temperature cycle test in a range from −40° C. to +125° C. by simulating a cold weather region for the low temperature and an engine room for the high temperature. According to the solder alloy of the invention, by repeating the process in which Sb added enters into solid solution again in the Sn matrix in a high temperature state of, for example, 125° C. and the SnSb intermetallic compound is precipitated in a low temperature state of, for example, −40° C., coarsening of the SnSb intermetallic compound is stopped, and the SnSb intermetallic compound which was once coarsened is also redissolved in the Sn matrix on the high temperature side during the temperature cycle test. Accordingly, the fine SnSb intermetallic compound is formed to maintain the precipitation and dispersion strengthened solder alloy.

However, if Sb is added in an amount exceeding 5 wt %, for example, 8 wt %, the SnSb compound at the beginning of the temperature cycle test has a large particle size and fine particles are not obtained. In addition, since the liquidus temperature is increased, the Sb added to the solder alloy does not redissolve on the high temperature side as well and is kept in the form of the original SnSb crystal grains. Therefore, even if the solder alloy is repeatedly used under the foregoing temperature cycle, the fine SnSb intermetallic compound is not formed.

In addition, if Sb is added in an amount exceeding 5 wt %, the liquidus temperature of the solder alloy is increased. Therefore, soldering cannot be performed without elevating the temperature for reflow heating. Under such elevated reflow conditions, Cu interconnected on the surface of a printed board melts into the solder, whereby an intermetallic compound layer made of SnCu such as $Cu_6Sn_5$ and having a large thickness is more likely to be formed at portions for soldering to the printed board, which facilitates breakage of the printed board and the solder joint portions.

According to the invention, Sb added to the solder alloy forms fine precipitates in the form of the SnSb compound in the Sn matrix of the solder alloy and the state of the fine SnSb intermetallic compound precipitates can be kept in the Sn matrix even after the temperature cycle ranging from −40° C. to +125° C. is repeated for around 3,000 cycles. The SnSb precipitates thus prevent cracking that may easily occur at the interfaces between electronic parts made of ceramics or the like and the solder joint portions.

According to the invention, even after the passage of the foregoing temperature cycle test, the particle size of the SnSb intermetallic compound in the Sn matrix is substantially the same as the particle size the SnSb intermetallic compound particles had before starting the test, in short, up to 0.6 μm, and indicates that coarsening is suppressed. Accordingly, even if a crack is partially formed in the solder, the fine SnSb intermetallic compound prevents the crack from propagating, whereby spreading of the crack inside the solder can be suppressed.

Advantageous Effects of Invention

In the solder alloy according to the invention, even if a temperature cycle test in a range from −40° C. to +125° C. is repeated for around 3,000 cycles, solder joint portions having a very small amount of solder also do not have cracks. In addition, even in a case where a crack occurred, the crack is prevented from propagating in the solder, whereby excellent temperature cycle characteristics can be exhibited.

Even when the solder alloy according to the invention is used in a usage environment exposed to a temperature cycle ranging from −40° C. to +125° C., using the solder alloy according to the invention in a very small solder amount in soldering an in-vehicle electronic circuit having few solder fillets and including thin solder joint portions prevents occurrence of cracks at the solder joint portions and suppresses propagation of cracks in the solder even if the cracks occur. Accordingly, highly reliable in-vehicle electronic circuit and in-vehicle electronic circuit unit can be obtained.

In addition, the solder alloy according to the invention is also prevented from having cracks that may occur at the joint interface and has characteristics particularly suitable to soldering of an ECU unit.

BEST MODE FOR CARRYING OUT INVENTION

When Sb is added to the solder alloy of the invention in an amount of less than 1 wt %, the form in which the Sb is dispersed in an Sn matrix does not appear, nor does the solid solution strengthening effect appear because the Sb amount is too small. In addition, the shear strength of the solder joint portions is also decreased. When Sb is added in an amount exceeding 5 wt %, the Sb does not remelt at a high temperature in excess of 125° C. as seen during engine operation under the scorching sun because of an increase in the liquidus temperature. Accordingly, an SnSb intermetallic compound gets coarsened and propagation of cracks in the solder cannot be suppressed. In addition, since the temperature peak during mounting increases with increasing liquidus temperature, Cu interconnected on the surface of a printed board melts into the solder, whereby an intermetallic compound layer made of SnCu such as $Cu_6Sn_5$ and having a large thickness is more likely to be formed at portions for soldering to the printed board, which facilitates breakage of the printed board and the solder joint portions.

Accordingly, the Sb amount according to the invention is 1 to 5 wt % and preferably 3 to 5 wt %. In cases where Bi to be described later is to be blended, the Sb amount is preferably more than 3% but up to 5%.

The solder alloy according to the invention suppresses occurrence and propagation of cracks in the solder and also suppresses occurrence of cracks at the solder joint interface between a ceramic part and a solder joint portion. For example, soldering to a Cu land causes a $Cu_6Sn_5$ intermetallic compound to be formed at the joint interface to the Cu land but Ni contained in the solder alloy of the invention in an amount of 0.01 to 0.2 wt % moves to the soldering interface portion at the time of soldering to form $(CuNi)_6Sn_5$ instead of $Cu_6Sn_5$, thereby increasing the Ni concentration in the $(CuNi)_6Sn_5$ intermetallic compound layer at the interface. The intermetallic compound layer thus formed at the soldering interface is composed of $(CuNi)_6Sn_5$ which is finer and more uniform in particle size than $Cu_6Sn_5$. The intermetallic compound layer composed of finer $(CuNi)_6Sn_5$ has the effect of suppressing cracks which may propagate from the interface. In the layer of an intermetallic compound having a large particle size such as $Cu_6Sn_5$, a crack having occurred propagates along particles whose size is large and hence spreads rapidly. In contrast, when the particle size is very small, the stress of a crack having occurred is dispersed in many particle size directions and it is therefore possible to slow down spreading of the crack.

As described above, in the solder alloy of the invention, addition of Ni serves to make finer the intermetallic compound of the intermetallic compound layer occurring in the vicinity of the soldering interface, thereby suppressing occurrence of cracks and propagation of cracks that once occurred. Therefore, it is also possible to suppress occurrence and propagation of cracks from the joint interface.

When the Ni content is less than 0.01 wt %, the effect of modifying the interface of a solder joint portion is insufficient because of a small Ni content at the soldering interface and hence there is no crack suppressing effect. When the Ni content exceeds 0.2 wt %, remelting of Sb added according to the invention does not occur because of an increase in the liquidus temperature and the effect of keeping the particle size of the fine SnSb intermetallic compound is hindered.

Accordingly, the Ni content according to the invention is preferably 0.01 to 0.2 wt %, more preferably 0.02 to 0.1 wt %, and even more preferably 0.02 to 0.08%.

Ag which is added according to the invention exhibits the effect of improving the solder wettability and the effect of improving the temperature cycle characteristics by forming a precipitation and dispersion strengthened alloy through precipitation of a network-like compound such as an $Ag_3Sn$ intermetallic compound in the solder matrix.

When the Ag content is less than 1 wt %, the solder alloy of the invention does not exhibit the effect of improving the solder wettability or have a firm intermetallic compound network because of a decrease in the $Ag_3Sn$ precipitation amount. When the Ag content is more than 4 wt %, remelting of Sb added according to the invention does not occur because of an increase in the solder liquidus temperature, thus hindering the SnSb intermetallic compound refining effect.

Therefore, Ag is added according to the invention in an amount of preferably 1 to 4 wt %, and more preferably 3.2 to 3.8 wt %.

Cu which is added to the solder alloy of the invention has the effect of preventing Cu contained in the Cu land from dispersing in the solder alloy and the effect of improving the temperature cycle characteristics by precipitating a fine $Cu_6Sn_5$ compound in the solder matrix.

When the Cu content in the solder alloy of the invention is less than 0.6 wt %, Cu contained in the Cu land is not prevented from dispersing in the solder alloy, whereas when Cu is added in an amount exceeding 0.8 wt %, the $Cu_6Sn_5$ intermetallic compound is also precipitated in a large amount at the joint interface. Accordingly, growth of cracks due to vibrations or other factor is accelerated.

In the solder alloy of the invention, the temperature cycle characteristics can be further improved by adding Bi. Sb added in the invention not only has the effect of forming a precipitation and dispersion strengthened alloy through precipitation of the SnSb intermetallic compound but also has the effect of distorting an atomic arrangement lattice and strengthening the Sn matrix by penetrating into the atomic arrangement lattice and being substituted for Sn, thereby improving the temperature cycle characteristics. If the solder contains Bi, the Bi is substituted for Sb in this process and hence the temperature cycle characteristics can be further improved because Bi has a larger atomic weight than Sb and is more effective in distorting the atomic arrangement lattice. In addition, Bi does not prevent formation of the fine SnSb intermetallic compound to maintain the precipitation and dispersion strengthened solder alloy.

When Bi is added to the solder alloy of the invention in an amount of less than 1.5 wt %, there is no effect of improving the temperature cycle because Bi is less likely to be substituted for Sb to reduce the amount of the fine SnSb intermetallic compound. When Bi is added in an amount exceeding 5.5 wt %, the ductility of the solder alloy itself is reduced to make the solder alloy harder and brittler. Accordingly, growth of cracks due to vibrations or other factor is accelerated.

Bi is added to the solder alloy of the invention in an amount of preferably 1.5 to 5.5 wt %, more preferably 3 to 5 wt %, and even more preferably 3.2 to 5.0 wt %.

In addition, the solder alloy of the invention can enhance the Ni effect according to the invention by adding Co or Fe or both of them. In particular, Co exhibits an excellent effect.

When Co and Fe are added to the solder alloy of the invention in a total amount of less than 0.001 wt %, the effect of preventing growth of interfacial cracks through precipitation at the joint interface is not seen, whereas when they are added in an amount exceeding 0.1 wt %, the intermetallic compound layer formed by interfacial precipitation has an increased thickness to accelerate growth of cracks due to vibrations or other factor.

Co or Fe, or both of them are added according to the invention in an amount of preferably 0.001 to 0.1 wt %.

As is clear from the description given above, the solder alloy according to the invention has excellent heat cycle characteristics and suppresses occurrence and propagation of cracks in the solder. Accordingly, growth and spread of cracks are not accelerated even when the solder alloy is used in an automobile used in a state in which it is continually subjected to vibrations, in short, as an in-vehicle alloy. Accordingly, it is seen that the solder alloy according to the invention which has particularly remarkable characteristics as described above is particularly suitable to soldering of an electronic circuit to be mounted on an automobile.

The expression "excellent heat cycle characteristics" as used in the specification refers to a state in which the ratio of crack occurrence after 3,000 cycles is up to 90% and the rate of residual shear strength after 3,000 cycles as above is at least 30% even in a heat cycle test carried out at −40° C. or less and 125° C. or more.

Such characteristics mean that the in-vehicle electronic circuit is not broken, in other words, is not brought into an unusable state or malfunction even when the solder alloy is used under very severe conditions as in the foregoing heat cycle test, and the solder alloy is highly reliable as the solder alloy particularly for use in soldering of ECU. The solder alloy of the invention also has a high rate of residual shear strength after the passage of the temperature cycling. More specifically, the resistance to external forces, for example, the shear strength against external forces which are applied from outside by a collision, vibrations and the like does not decrease even after a long period of use.

As described above, the solder alloy according to the invention is a solder alloy exhibiting excellent heat cycle characteristics when used more specifically in soldering of an in-vehicle electronic circuit or in soldering of an ECU electronic circuit.

The "electronic circuit" is a system allowing a desired function to be achieved as a whole by an electronic combination of a plurality of electronic parts having their own functions.

Exemplary electronic parts configuring the electronic circuit as described above include a chip resistor part, a multiple resistance part, a QFP, a QFN, a power transistor, a diode, and a capacitor. An electronic circuit incorporating any of these electronic parts is provided on a board to configure an electronic circuit unit.

According to the invention, the board configuring the electronic circuit unit as described above, as exemplified by a printed circuit board is not particularly limited. The material of the board is also not particularly limited and an exemplary board includes a heat resistant plastic board (e.g., FR-4 having a high Tg and a low CTE). The printed circuit board is preferably one obtained by treating the Cu land surface with organic substances (OSP (Organic Surface Protection) materials) such as amines and imidazoles.

The lead-free solder according to the invention has the shape for use in joining fine solder portions and is hence generally used in the form of solder paste in reflow soldering but may be used as a solder preform having the shape of a ball, a pellet, a washer or the like.

EXAMPLE 1

In Table 1, the liquidus temperature, the SnSb particle size as the initial value and after 1,500 cycles in the temperature cycle test, and the crack ratio of the respective solder alloys in Table 1 were measured by the following methods.

(Solder Melting Test)

Each solder alloy in Table 1 was prepared to measure the solder melting temperature. The solidus temperature was measured by a method according to JIS Z3198-1. The liquidus temperature was measured not by applying JIS Z3198-1 but by the same DSC method as the method of measuring the solidus temperature according to JIS Z3198-1.

The results are shown in the column of "Liquidus temperature" in Table 1.

(Temperature Cycle Test)

Each solder alloy in Table 1 was atomized to form solder powder. The solder powder was mixed with soldering flux including pine resin, a solvent, an activator, a thixotropic agent, an organic acid and the like to prepare solder paste of each solder alloy. The solder paste was printed on a six-layer printed board (material: FR-4) with a 150 μm metal mask. Then, 3216 chip resistors were mounted by a mounter and subjected to reflow soldering under conditions of a maximum temperature of 235° C. and a retention time of 40 seconds, thereby preparing a test board.

The test board obtained by soldering with each solder alloy was put in a temperature cycle tester set under conditions of a low temperature of −40° C., a high temperature of +125° C. and a retention time of 30 minutes, taken out of the temperature cycle tester after 1,500 cycles following measurement of the initial value, and observed with an electron microscope at a magnification of 3,500× to measure the average particle size of SnSb intermetallic compound particles in the Sn matrix of the solder alloy.

The results are shown in the columns of "Crack ratio" and "SnSb particle size" in Table 1.

In Table 1, *1 shows that the SnSb intermetallic compound was not seen and measurement could not be made and *2 shows that the solder had a high liquidus temperature and soldering could not be performed under a reflow condition of 235° C.

(Crack Ratio)

The ratio of crack occurrence serves to know to what degree the region where cracks occur extends with respect to the assumed crack length. After the measurement of the SnSb particle size, the crack state was observed using an electron microscope at a magnification of 150× and the total crack length was assumed to measure the crack ratio.

Crack ratio (%)=(total crack length/assumed crack total length)×100

The "assumed crack total length" as used herein refers to the length of a crack at the time of complete breakage.

The crack ratio is a ratio obtained by diving the total length of a plurality of cracks 7 shown in FIG. 5 by the length of a path 8 which the cracks are assumed to follow.

The results are shown in Table 1.

TABLE 1

| | Solder composition (wt %) | | | | | Liquidus temperature | SnSb particle size (μm) | |
| | | | | | | | Initial | 1500 cycles |
| --- | --- | --- | --- | --- | --- | --- | --- | --- |
| | Sn | Ag | Cu | Ni | Sb | Bi | | |
| Example 1 | Balance | 1 | 0.5 | 0.01 | 5 | — | 227 | 0.5 | 0.6 |
| Example 2 | Balance | 3.4 | 0.7 | 0.04 | 1 | — | 221 | 0.4 | 0.6 |
| Example 3 | Balance | 3.4 | 0.7 | 0.04 | 5 | — | 227 | 0.4 | 0.6 |
| Example 4 | Balance | 3.4 | 0.7 | 0.04 | 4 | 4 | 221 | 0.5 | 0.5 |
| Example 5 | Balance | 3.4 | 0.7 | 0.04 | 5 | 4 | 223 | 0.4 | 0.5 |
| Example 6 | Balance | 3.4 | 0.7 | 0.04 | 2 | 5 | 217 | 0.5 | 0.6 |
| Example 7 | Balance | 4 | 1 | 0.2 | 5 | — | 227 | 0.4 | 0.6 |
| Comparative Example 1 | Balance | 3.4 | 0.7 | 0.04 | 0.1 | — | 219 | *1 | *1 |
| Comparative Example 2 | Balance | 3.4 | 0.7 | 0.04 | 8 | — | 245 | *2 | *2 |
| Comparative Example 3 | Balance | 0.3 | 0.3 | 0.4 | 0.2 | 1 | 231 | *1 | *1 |
| Comparative Example 4 | Balance | 3 | 1 | 0.04 | 10 | — | 257 | *2 | *2 |

Table 1 reveals that even after 1,500 cycles in the temperature cycle test, the SnSb crystal grains do not coarsen but remain unchanged from the initial value.

FIG. 3 shows the state of an SnSb intermetallic compound 7 in the solder alloy in Example 5 after 3,000 cycles in the temperature cycle test as taken with an electron microscope at a magnification of 3,500×. The SnSb intermetallic compound in Example 5 is fine and is uniformly dispersed in the solder. Therefore, no matter where the solder alloy is cracked, the crack is prevented from entering the SnSb intermetallic compound.

FIG. 4 shows the state of the SnSb intermetallic compound 7 in the solder alloy in Comparative Example 4 after 3,000 cycles in the temperature cycle test as taken with an electron microscope at a magnification of 3,500×. The SnSb intermetallic compound in this Comparative Example coarsens and cracks cannot be prevented from occurring in the SnSb intermetallic compound.

EXAMPLE 2

Next, in Table 2, the ratio of crack occurrence and the rate of residual shear strength after 3,000 cycles in the temperature cycle test were measured in the respective solder alloys in Table 2. The method of measuring the ratio of crack occurrence was the same as in Table 1 but the number of cycles was changed to 3,000 cycles. The method of measuring the rate of residual shear strength is as described below.

(Rate of Residual Shear Strength)

The rate of residual shear strength serves to know to what extent the strength is kept after the temperature cycle test with respect to the shear strength of the solder joint portion in the initial state.

The shear strength test was carried out at room temperature under conditions of a test rate of 6 mm/min and a test height of 50 μm using a joint strength tester STR-1000.

The results are compiled in Table 2.

TABLE 2

| | Solder composition (wt %) | | | | | | | | Average ratio of crack occurrence after 3000 cycles [%] | Rate of residual shear strength after 3000 cycles [%] |
| | Sn | Ag | Cu | Ni | Sb | Bi | Co | Fe | | |
| --- | --- | --- | --- | --- | --- | --- | --- | --- | --- | --- |
| Example 1 | Balance | 1.0 | 0.5 | 0.01 | 5.0 | — | — | — | 79.0 | 25.0 |
| Example 2 | Balance | 3.4 | 0.7 | 0.04 | 1.0 | — | — | — | 87.0 | 40.0 |
| Example 3 | Balance | 3.4 | 0.7 | 0.04 | 5.0 | — | — | — | 72.0 | 31.8 |
| Example 5 | Balance | 3.4 | 0.7 | 0.04 | 5.0 | 4.0 | — | — | 59.0 | 54.5 |
| Example 4 | Balance | 3.4 | 0.7 | 0.04 | 4.0 | 4.0 | — | — | 63.0 | 60.0 |
| Example 6 | Balance | 3.4 | 0.7 | 0.04 | 2.0 | 5.0 | — | — | 78.0 | 49.0 |
| Example 7 | Balance | 4.0 | 1.0 | 0.2 | 5.0 | — | — | — | 74.0 | 31.0 |
| Example 8 | Balance | 1.0 | 0.6 | 0.01 | 5.0 | — | — | — | 85.0 | 30.0 |
| Example 9 | Balance | 3.4 | 0.7 | 0.04 | 1.0 | 1.5 | — | — | 86.0 | 33.6 |
| Example 10 | Balance | 3.4 | 0.7 | 0.04 | 1.0 | 3.0 | — | — | 84.0 | 41.6 |
| Example 11 | Balance | 3.4 | 0.7 | 0.04 | 1.0 | 3.2 | — | — | 84.0 | 43.6 |
| Example 12 | Balance | 3.4 | 0.7 | 0.04 | 1.0 | 3.5 | — | — | 82.0 | 41.6 |
| Example 13 | Balance | 3.4 | 0.7 | 0.04 | 1.0 | 5.0 | — | — | 80.0 | 39.2 |
| Example 14 | Balance | 3.4 | 0.7 | 0.04 | 1.0 | 5.5 | — | — | 82.0 | 36.6 |
| Example 15 | Balance | 3.4 | 0.7 | 0.04 | 2.0 | — | — | — | 85.0 | 41.7 |
| Example 16 | Balance | 3.4 | 0.7 | 0.04 | 2.0 | 1.5 | — | — | 84.0 | 48.0 |
| Example 17 | Balance | 3.4 | 0.7 | 0.04 | 2.0 | 2.5 | — | — | 82.0 | 50.0 |
| Example 18 | Balance | 3.4 | 0.7 | 0.04 | 2.0 | 3.0 | — | — | 82.0 | 49.5 |
| Example 19 | Balance | 3.4 | 0.7 | 0.04 | 2.0 | 3.2 | — | — | 82.0 | 49.3 |
| Example 20 | Balance | 3.4 | 0.7 | 0.04 | 2.0 | 3.5 | — | — | 80.0 | 49.1 |
| Example 21 | Balance | 3.4 | 0.7 | 0.04 | 2.0 | 5.5 | — | — | 80.0 | 47.0 |
| Example 22 | Balance | 3.4 | 0.7 | 0.04 | 3.0 | — | — | — | 82.0 | 38.0 |

TABLE 2-continued

| | Solder composition (wt %) | | | | | | | Average ratio of crack occurrence after 3000 cycles [%] | Rate of residual shear strength after 3000 cycles [%] |
|---|---|---|---|---|---|---|---|---|---|
| | Sn | Ag | Cu | Ni | Sb | Bi | Co | Fe | | |
| Example 23 | Balance | 3.4 | 0.7 | 0.04 | 3.0 | 1.5 | — | — | 78.0 | 55.0 |
| Example 24 | Balance | 3.4 | 0.7 | 0.04 | 3.0 | 3.0 | — | — | 70.0 | 63.0 |
| Example 25 | Balance | 3.4 | 0.7 | 0.04 | 3.0 | 3.2 | — | — | 65.0 | 65.0 |
| Example 26 | Balance | 3.4 | 0.7 | 0.04 | 3.0 | 3.5 | — | — | 68.0 | 63.0 |
| Example 27 | Balance | 3.4 | 0.7 | 0.04 | 3.0 | 5.0 | — | — | 73.0 | 60.6 |
| Example 28 | Balance | 3.4 | 0.7 | 0.04 | 3.0 | 5.5 | — | — | 75.0 | 58.0 |
| Example 29 | Balance | 3.4 | 0.7 | 0.04 | 4.0 | — | — | — | 78.0 | 35.0 |
| Example 30 | Balance | 3.4 | 0.7 | 0.04 | 4.0 | 1.5 | — | — | 74.0 | 45.0 |
| Example 31 | Balance | 3.4 | 0.7 | 0.04 | 4.0 | 2.5 | — | — | 73.0 | 53.0 |
| Example 32 | Balance | 3.4 | 0.7 | 0.04 | 4.0 | 3.0 | — | — | 66.0 | 54.0 |
| Example 33 | Balance | 3.4 | 0.7 | 0.04 | 4.0 | 3.2 | — | — | 61.0 | 55.0 |
| Example 34 | Balance | 3.4 | 0.7 | 0.04 | 4.0 | 3.5 | — | — | 64.0 | 58.0 |
| Example 35 | Balance | 3.4 | 0.7 | 0.04 | 4.0 | 5.0 | — | — | 69.0 | 55.0 |
| Example 36 | Balance | 3.4 | 0.7 | 0.04 | 4.0 | 5.5 | — | — | 71.0 | 48.0 |
| Example 37 | Balance | 3.4 | 0.7 | 0.04 | 5.0 | 1.5 | — | — | 65.5 | 45.0 |
| Example 38 | Balance | 3.4 | 0.7 | 0.04 | 5.0 | 2.0 | — | — | 65.0 | 50.0 |
| Example 39 | Balance | 3.4 | 0.7 | 0.04 | 5.0 | 3.0 | — | — | 54.0 | 51.0 |
| Example 40 | Balance | 3.4 | 0.7 | 0.04 | 5.0 | 3.2 | — | — | 49.0 | 52.0 |
| Example 41 | Balance | 3.4 | 0.7 | 0.04 | 5.0 | 3.5 | — | — | 52.0 | 53.0 |
| Example 42 | Balance | 3.4 | 0.7 | 0.04 | 5.0 | 5.0 | — | — | 57.0 | 57.5 |
| Example 43 | Balance | 3.4 | 0.7 | 0.04 | 5.0 | 5.5 | — | — | 59.0 | 54.9 |
| Example 44 | Balance | 3.4 | 0.7 | 0.04 | 3.0 | 3.2 | 0 | — | 65.0 | 65.0 |
| Example 45 | Balance | 3.4 | 0.7 | 0.04 | 3.0 | 3.2 | 0.01 | — | 58.0 | 72.0 |
| Example 46 | Balance | 3.4 | 0.7 | 0.04 | 3.0 | 3.2 | 0.05 | — | 60.0 | 70.0 |
| Example 47 | Balance | 3.4 | 0.7 | 0.04 | 3.0 | 3.2 | 0.01 | 0.008 | 54.0 | 71.0 |
| Comparative Example 5 | Balance | 3.4 | 0.7 | 0.04 | 5.0 | 7.0 | — | — | 65.0 | 45.9 |
| Comparative Example 6 | Balance | 0.9 | 0.4 | 0.009 | 0.9 | — | — | — | 100.0 | 8.0 |
| Comparative Example 7 | Balance | 3.4 | 0.7 | 0.04 | — | — | — | — | 100.0 | 1.6 |
| Comparative Example 8 | Balance | 3.4 | 0.7 | 0.04 | — | 1.5 | — | — | 96.0 | 13.6 |
| Comparative Example 9 | Balance | 3.4 | 0.7 | 0.04 | — | 3.0 | — | — | 94.0 | 21.6 |
| Comparative Example 10 | Balance | 3.4 | 0.7 | 0.04 | — | 3.2 | — | — | 94.0 | 23.6 |
| Comparative Example 11 | Balance | 3.4 | 0.7 | 0.04 | — | 3.5 | — | — | 92.0 | 21.6 |
| Comparative Example 12 | Balance | 3.4 | 0.7 | 0.04 | — | 5.0 | — | — | 90.0 | 19.2 |
| Comparative Example 13 | Balance | 3.4 | 0.7 | 0.04 | — | 5.5 | — | — | 92.0 | 16.6 |
| Comparative Example 14 | Balance | 3.4 | 0.7 | 0.04 | — | 7.0 | — | — | 99.0 | 7.6 |
| Comparative Example 15 | Balance | 3.4 | 0.7 | 0.04 | 0.5 | — | — | — | 97.0 | 13.0 |
| Comparative Example 16 | Balance | 3.4 | 0.7 | 0.04 | 1.0 | 7.0 | — | — | 89.0 | 27.6 |
| Comparative Example 17 | Balance | 3.4 | 0.7 | 0.04 | 2.0 | 7.0 | — | — | 87.0 | 38.0 |
| Comparative Example 18 | Balance | 3.4 | 0.7 | 0.04 | 3.0 | 7.0 | — | — | 81.0 | 49.0 |
| Comparative Example 19 | Balance | 3.4 | 0.7 | 0.04 | 4.0 | 7.0 | — | — | 77.0 | 39.0 |
| Comparative Example 20 | Balance | 3.4 | 0.7 | 0.04 | 7.0 | — | — | — | 97.0 | 3.0 |
| Comparative Example 21 | Balance | 3.4 | 0.7 | 0.04 | 7.0 | 1.5 | — | — | 93.0 | 20.0 |
| Comparative Example 22 | Balance | 3.4 | 0.7 | 0.04 | 7.0 | 3.0 | — | — | 90.0 | 28.0 |
| Comparative Example 23 | Balance | 3.4 | 0.7 | 0.04 | 7.0 | 3.2 | — | — | 89.0 | 29.0 |
| Comparative Example 24 | Balance | 3.4 | 0.7 | 0.04 | 7.0 | 3.5 | — | — | 89.0 | 28.0 |
| Comparative Example 25 | Balance | 3.4 | 0.7 | 0.04 | 7.0 | 5.0 | — | — | 90.0 | 25.6 |
| Comparative Example 26 | Balance | 3.4 | 0.7 | 0.04 | 7.0 | 5.5 | — | — | 90.0 | 23.0 |
| Comparative Example 27 | Balance | 3.4 | 0.7 | 0.04 | 7.0 | 7.0 | — | — | 96.0 | 14.0 |
| Comparative Example 28 | Balance | 3.4 | 0.7 | 0.04 | 1.0 | — | 0.15 | — | 94.0 | 25.0 |
| Comparative Example 29 | Balance | 3.8 | 0.7 | 0.2 | 1.0 | 2.0 | — | — | 95.0 | *2 |

TABLE 2-continued

| | Solder composition (wt %) | | | | | | | Average ratio of crack occurrence after 3000 cycles [%] | Rate of residual shear strength after 3000 cycles [%] |
|---|---|---|---|---|---|---|---|---|---|
| | Sn | Ag | Cu | Ni | Sb | Bi | Co | Fe | | |
| Comparative Example 30 | Balance | 4.1 | 1.1 | 0.3 | 8.0 | — | — | — | *2 | 1.0 |

FIG. 6 shows a graph in which the ratio of crack occurrence and the rate of residual shear strength are plotted with respect to the Sb content in the Sn—Ag—Cu—Ni—Sb based solder alloys in Table 2. When the Sb content is in a range of 1.0 to 5.0% according to the invention, the ratio of crack occurrence is up to 90% and the rate of residual shear strength is 30% or more, and the solder alloy obtained according to the invention has excellent temperature cycle characteristics and is resistant to impact of a collision or the like.

FIG. 7 shows a graph in which the ratio of crack occurrence is plotted on a Sb content basis with respect to the Bi content in the Sn—Ag—Cu—Ni—Sb—Bi based solder alloys in Table 2. When the Bi content is in a range of 1.5 to 5.5% according to the invention and the Sb content is 1 to 5%, the ratio of crack occurrence is up to 90%, and the temperature cycle characteristics are excellent and occurrence of cracks can be suppressed.

FIG. 8 shows a graph in which the rate of residual shear strength is plotted on a Sb content basis with respect to the Bi content in the Sn—Ag—Cu—Ni—Sb—Bi based solder alloys in Table 2. When the Bi content is in a range of 1.5 to 5.5% according to the invention and the Sb content is 1 to 5%, the rate of residual shear strength is 30% or more. The solder alloys are resistant to impact of a collision or the like and occurrence of cracks can be suppressed.

Consequently, in the solder alloy according to the invention, the SnSb crystal grains do not coarsen but remain unchanged from the initial value even under severe temperature conditions ranging from −40° C. to +125° C. which are necessary to the automobile ECU substrate, and as a result, occurrence of cracks that may occur from inside the solder can also be reduced as compared to other solder alloys.

INDUSTRIAL APPLICABILITY

The lead-free solder alloy according to the invention may be a solder having a shape not only for reflow soldering but also for flow soldering such as an ingot shape, a bar shape or a linear shape, or a rosin core solder having a shape for manual soldering.

Figure 1:
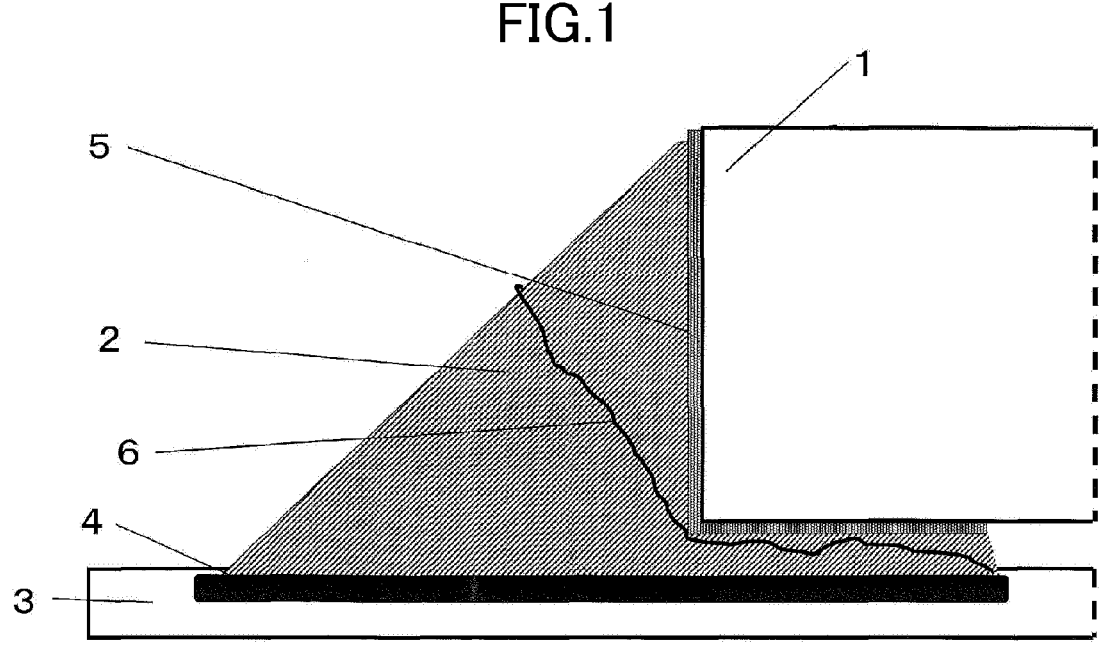
FIG. 1 is a schematic diagram of the periphery of a solder joint portion in a conventional electronic circuit.
Figure 2:
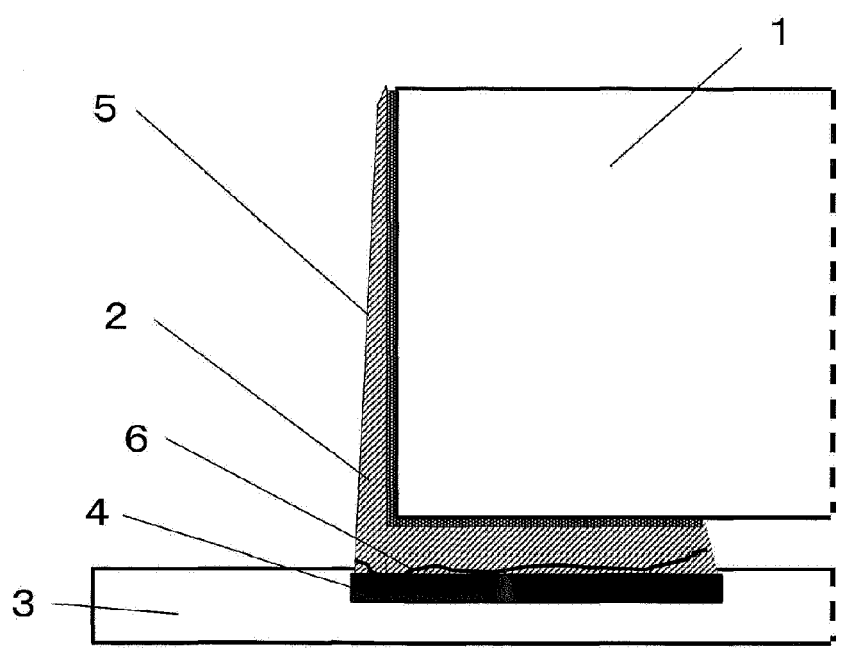
FIG. 2 is a schematic diagram of the periphery of a solder joint portion in an in-vehicle electronic circuit according to the present application.
Figure 3:
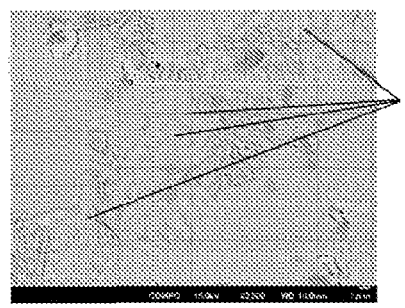
FIG. 3 is an electron micrograph showing the state of an SnSb intermetallic compound in a solder alloy according to the invention (Example 5) after 3,000 cycles in the temperature cycle test.
Figure 4:
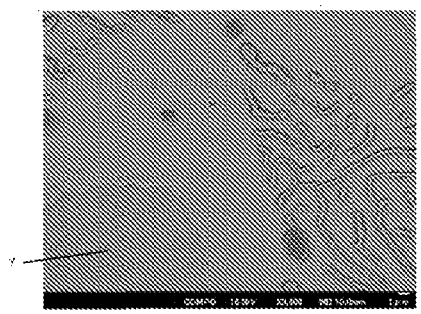
FIG. 4 is an electron micrograph showing the state of an SnSb intermetallic compound in a solder alloy according to a comparative example (Comparative Example 4) after 3,000 cycles in the temperature cycle test.
Figure 5:
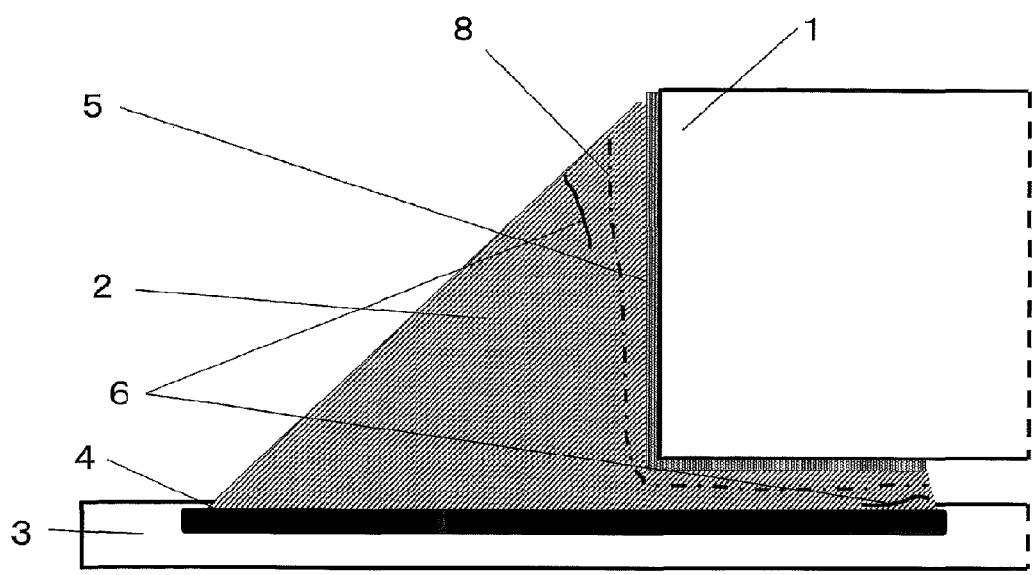
FIG. 5 is a schematic diagram showing a method of calculating the crack ratio.
Figure 6:
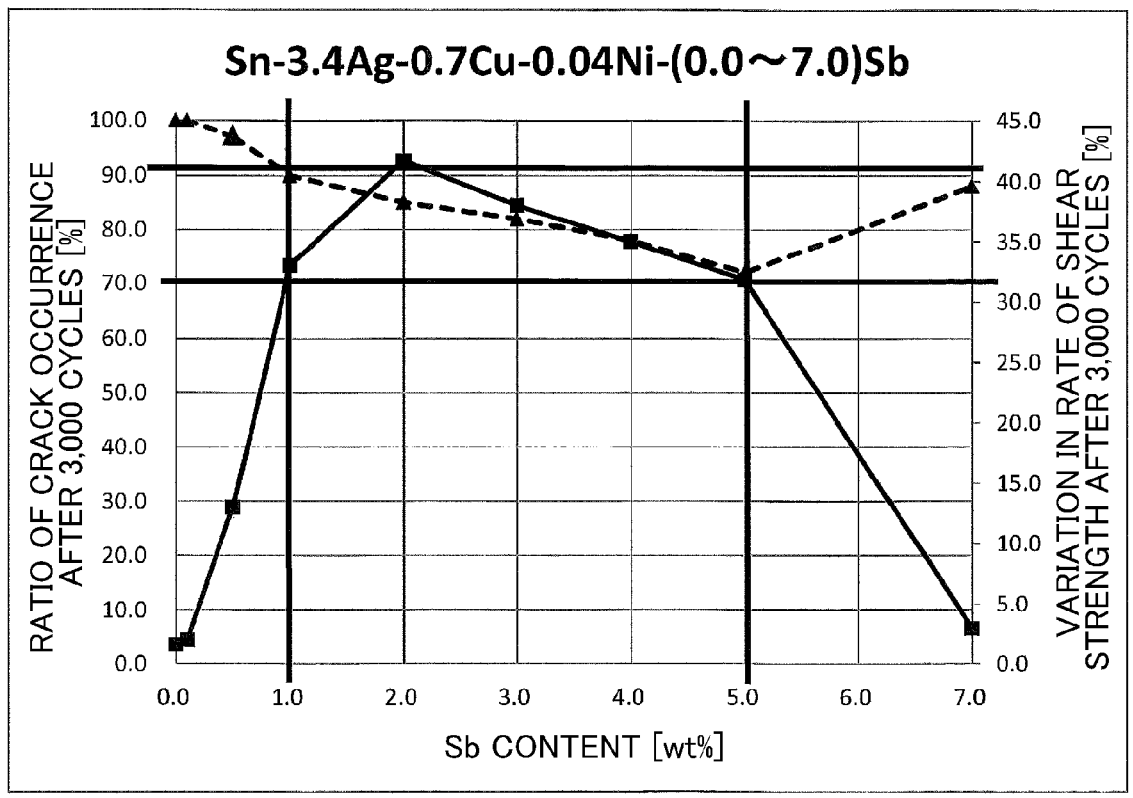
FIG. 6 is a graph in which the ratio of crack occurrence and the rate of residual shear strength are plotted with respect to the Sb content (without Bi) based on Table 2.
Figure 7:
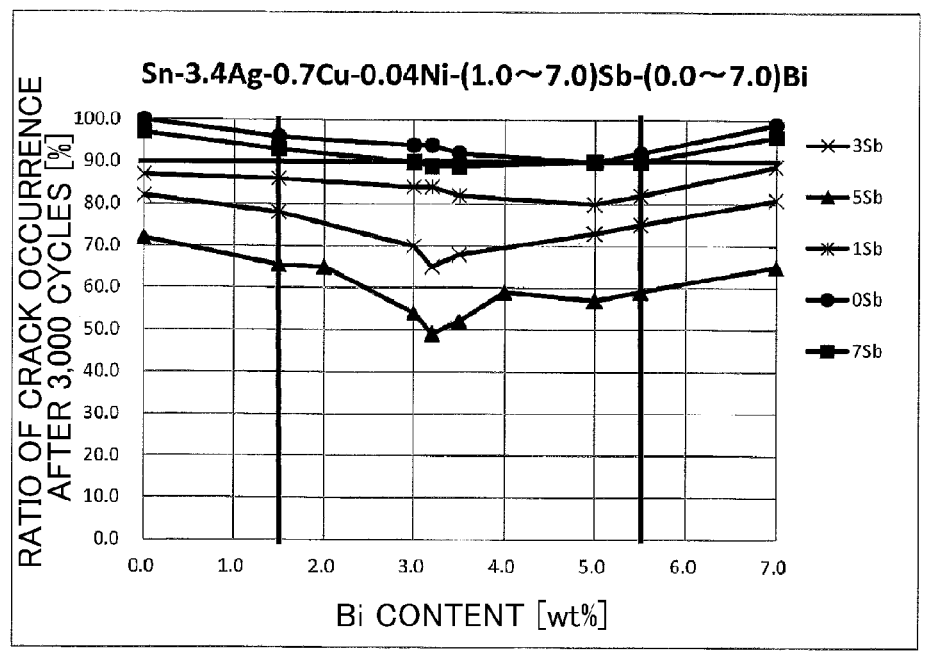
FIG. 7 is a graph in which the ratio of crack occurrence is plotted with respect to the Bi content based on Table 2.
Figure 8:
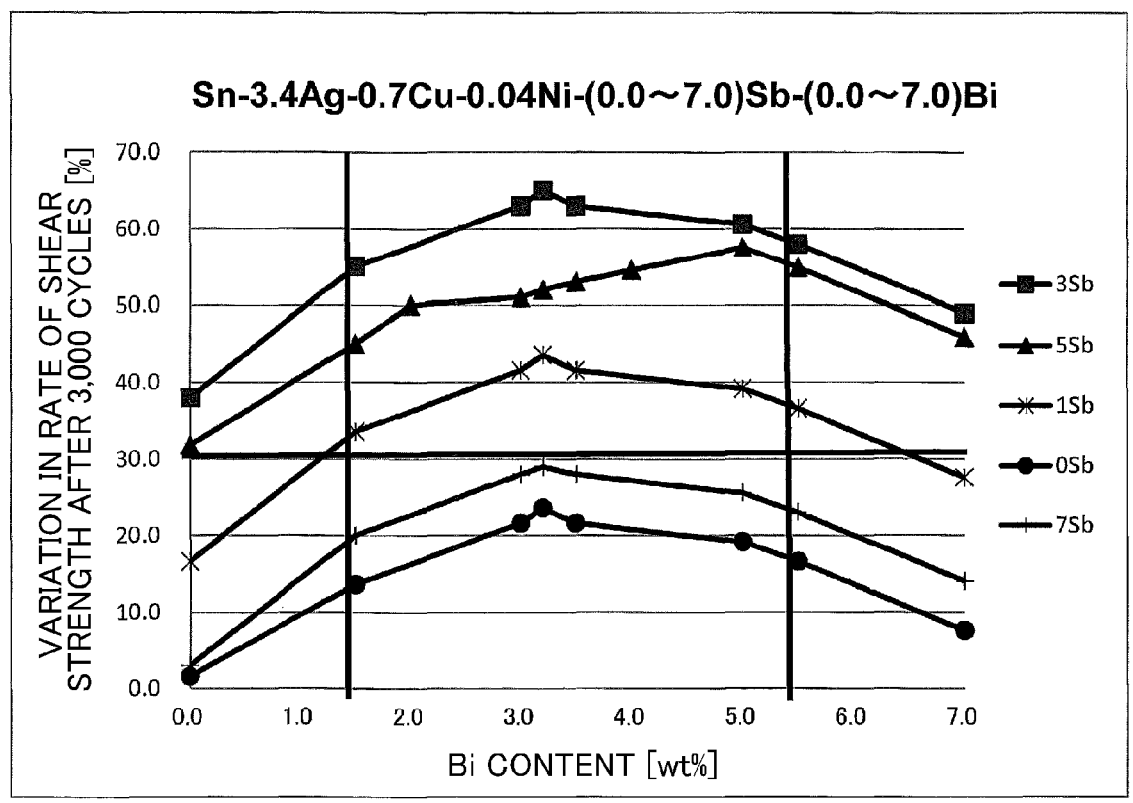
FIG. 8 is a graph in which the rate of residual shear strength is plotted with respect to the Bi content based on Table 2.

DESCRIPTION OF SYMBOLS 1 chip part
2 solder alloy
3 board
4 Cu land
5 intermetallic compound layer
6 path which cracks follow
7 SnSb intermetallic compound
8 path which cracks are assumed to follow

The invention claimed is:
1. A lead-free solder alloy consisting of:
3.2 to 3.8 wt % of Ag;
0.6 to 0.8 wt % of Cu;
2 to 5 wt% of Sb;
0.01 to 0.2 wt % of Ni;
5 to 5.5 wt % of Bi;
0.001 to 0.01 wt% of Co; and
a balance of Sn.
2. The lead-free solder alloy according to claim 1, wherein a rate of residual shear strength after 3,000 cycles of a temperature cycle test with respect to an initial value is 30% or more.
3. The lead-free solder alloy according to claim 2, wherein the solder alloy is joined to a board having undergone a Cu-OSP process.
4. An in-vehicle electronic circuit comprising a solder joint portion consisting of the lead-free solder alloy according to claim 2.
5. An ECU electronic circuit comprising a solder joint portion consisting of the lead-free solder alloy according to claim 2.
6. The lead-free solder alloy according to claim 1, wherein the solder alloy is joined to a board having undergone a Cu-OSP process.
7. The lead-free solder alloy according to claim 6, wherein a rate of residual shear strength after 3,000 cycles of a temperature cycle test with respect to an initial value is 30% or more.
8. The lead-free solder alloy according to claim 7, wherein the solder alloy is joined to a board having undergone a Cu-OSP process.

9. An in-vehicle electronic circuit comprising a solder joint portion consisting of the lead-free solder alloy according to claim 7.

10. An ECU electronic circuit comprising a solder joint portion consisting of the lead-free solder alloy according to claim 7.

11. An in-vehicle electronic circuit comprising a solder joint portion consisting of the lead-free solder alloy according to claim 6.

12. An ECU electronic circuit comprising a solder joint portion consisting of the lead-free solder alloy according to claim 6.

13. An in-vehicle electronic circuit comprising a solder joint portion consisting of the lead-free solder alloy according to claim 1.

14. An in-vehicle electronic circuit unit comprising the electronic circuit according to claim 13.

15. An ECU electronic circuit comprising a solder joint portion consisting of the lead-free solder alloy according to claim 1.

16. An ECU electronic circuit unit comprising the ECU electronic circuit according to claim 15.

17. The lead-free solder alloy according to claim 1, which contains 3 to 5 wt% of Sb.

18. A lead-free solder alloy consisting of:
1 to 4 wt % of Ag;
0.6 to 0.8 wt % of Cu;
2 to 5 wt % of Sb;
0.01 to 0.2 wt % of Ni;
5 to 5.5 wt % of Bi;
0.001 to 0.1 wt % of Co; and
a balance of Sn.

19. The lead-free solder alloy according to claim 18, which contains 3 to 5 wt % of Sb.

* * * * *